United States Patent
Hsieh et al.

(10) Patent No.: US 11,402,738 B2
(45) Date of Patent: Aug. 2, 2022

(54) ILLUMINATION SYSTEM AND PROJECTION APPARATUS

(71) Applicant: Coretronic Corporation, Hsin-Chu (TW)

(72) Inventors: Chi-Tang Hsieh, Hsin-Chu (TW); Chih-Hsien Tsai, Hsin-Chu (TW); Yao-Shun Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/402,166

(22) Filed: May 2, 2019

(65) Prior Publication Data

US 2019/0346755 A1 Nov. 14, 2019

(30) Foreign Application Priority Data

May 14, 2018 (CN) .......................... 201820708950.3

(51) Int. Cl.
*G03B 21/20* (2006.01)

(52) U.S. Cl.
CPC ......... *G03B 21/208* (2013.01); *G03B 21/204* (2013.01); *G03B 21/2013* (2013.01)

(58) Field of Classification Search
CPC .............. G03B 21/308; G03B 21/2013; G03B 21/204; G03B 21/208
See application file for complete search history.

(56) References Cited

U.S. PATENT DOCUMENTS

| | | | | |
|---|---|---|---|---|
| 5,594,526 A | * | 1/1997 | Mori | G02B 3/0056 359/620 |
| 6,607,276 B1 | * | 8/2003 | Akiyama | H04N 9/3105 353/38 |
| 9,554,101 B2 | | 1/2017 | Bhakta | |
| 2004/0257537 A1 | * | 12/2004 | Bierhuizen | G03B 21/006 353/31 |
| 2012/0300178 A1 | * | 11/2012 | Sugiyama | H04N 9/3164 315/297 |

(Continued)

FOREIGN PATENT DOCUMENTS

| | | |
|---|---|---|
| CN | 103216774 | 9/2015 |
| TW | M423266 | 2/2012 |
| TW | I575300 | 3/2017 |

*Primary Examiner* — Rajarshi Chakraborty
*Assistant Examiner* — Nathaniel J Lee
(74) *Attorney, Agent, or Firm* — JCIPRNET (57) ABSTRACT

An illumination system including an exciting light source module, a wavelength conversion device and a light uniforming module is provided. The exciting light source module is configured to emit an exciting beam. The wavelength conversion device is disposed on a transmission path of the exciting beam and is configured to rotate around a central axis. The light uniforming module is disposed on the transmission path of the exciting beam and between the exciting light source module and the wavelength conversion device. After the exciting beam emitted from the exciting light source module passes through the light uniforming module, the exciting beam forms a light spot on the wavelength conversion device. The energy intensity distribution of the light spot along the radial direction about the central axis is that the energy intensity is lower in the center and higher on the two sides. A projection apparatus is also provided.

16 Claims, 8 Drawing Sheets

(56) References Cited

U.S. PATENT DOCUMENTS

| | | | | |
|---|---|---|---|---|
| 2014/0118991 A1* | 5/2014 | Lin | ............... | G03B 21/204 362/324 |
| 2015/0277215 A1* | 10/2015 | Sudo | ............. | G02B 19/0014 353/38 |
| 2018/0329282 A1* | 11/2018 | Akiyama | ......... | G03B 21/208 |

* cited by examiner

ILLUMINATION SYSTEM AND PROJECTION APPARATUS

CROSS-REFERENCE TO RELATED APPLICATION

This application claims the priority benefit of China application serial no. 201820708950.3, filed on May 14, 2018. The entirety of the above-mentioned patent application is hereby incorporated by reference herein and made a part of this specification.

BACKGROUND OF THE INVENTION

Field of the Invention

The disclosure relates to an optical system and an optical apparatus, and more particularly, to an illumination system and a projection apparatus using the illumination system.

Description of Related Art

With the development of optical technology, solid-state lighting technologies such as light-emitting diodes (LEDs) and laser diodes (LDs) have become more and more widely used for light sources of projectors, among which the laser diodes can provide beams with a higher intensity, compared with the light emitting diodes, to be used as light sources of projectors. Therefore, how to use the high-intensity beam provided by laser diodes as pure color light sources of projectors is a major issue at present.

The use of high-intensity laser light emitted from the laser diode to excite the phosphor wavelength conversion module is one of the common techniques in the current application of the laser diode as a light source. However, the light spot formed by the semiconductor laser light is approximately elliptical, and its light intensity distribution is close to the Gaussian distribution. Because the light spot formed by the laser light having a light intensity close to the Gaussian distribution has a higher light intensity per unit area in the center, the temperature of the phosphor is overly high, resulting in a decrease in the conversion efficiency of the phosphor. Besides, the light spot with a light intensity overly concentrated is also more likely to cause the phosphor to burn out or to shorten the life of the phosphor.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The present invention provides an illumination system. The illumination system has a better illumination uniformity, a better light efficiency and a longer life.

The present invention provides a projection apparatus. The projection apparatus has a better image quality, a better light efficiency and a longer life.

Other features and advantages of the embodiments of the disclosure are illustrated by the technical features broadly embodied and described as follows.

In order to achieve one of or a portion of or all of the objects or other objects, an embodiment of the disclosure provides an illumination system including an exciting light source module, a wavelength conversion device and a light uniforming module. The exciting light source module is configured to emit an exciting beam. The wavelength conversion device is disposed on a transmission path of the exciting beam and is configured to rotate around a central axis. The light uniforming module is disposed on the transmission path of the exciting beam and between the exciting light source and the wavelength conversion device. After the exciting beam emitted from the exciting light source module passes through the light uniforming module, the exciting beam forms a light spot on the wavelength conversion device, and an energy intensity distribution of the light spot along a radial direction about the central axis is that an energy intensity in a center is lower than those on two sides.

In order to achieve one of or a portion of or all of the objects or other objects, an embodiment of the disclosure provides a projection apparatus including the illumination system, a light valve and a projection lens. The light valve is disposed on the transmission paths of the conversion beam and the exciting beam from a light combining unit, so as to modulate the conversion beam and the exciting beam into an image beam. The projection lens is disposed on a transmission path of the image beam.

Based on the above, in the illumination system and the projection apparatus according to the embodiments of the disclosure, after the exciting beam emitted from the exciting light source module passes through the light uniforming module, the exciting beam forms a light spot on the wavelength conversion device, and the energy intensity distribution of the light spot along the radial direction about the central axis is that the energy intensity is lower in the center and higher on the two sides. As such, the energy intensity of the exciting beam on the wavelength conversion device is not excessively concentrated, which may prevent the conversion efficiency of the wavelength conversion device from reducing and prevents the wavelength conversion device from burning out. In addition, the energy intensity distribution which is lower in the center and higher on the two sides may reduce the thermal energy accumulation from the center diffusing toward the two sides, such that the light spot is in a similar temperature in the center and on the two sides, which benefits in maintaining the conversion efficiency. Therefore, the illumination system according to the embodiments of the disclosure has a better illumination uniformity, a better light efficiency and a longer life. Accordingly, the projection apparatus according to the embodiments of the disclosure, which includes the aforementioned illumination system, has a better image quality, a better light efficiency and a longer life.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the invention and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
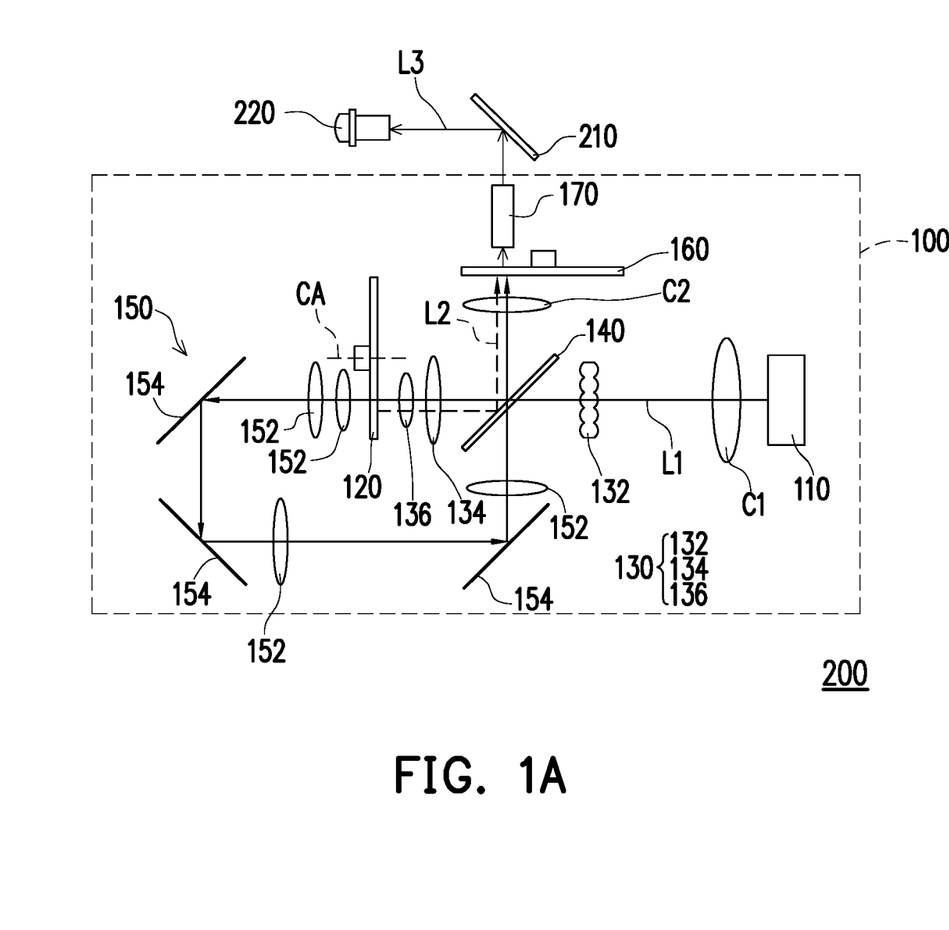
FIG. 1A is a schematic view of a projection apparatus according to an embodiment of the disclosure.
Figure 1B:
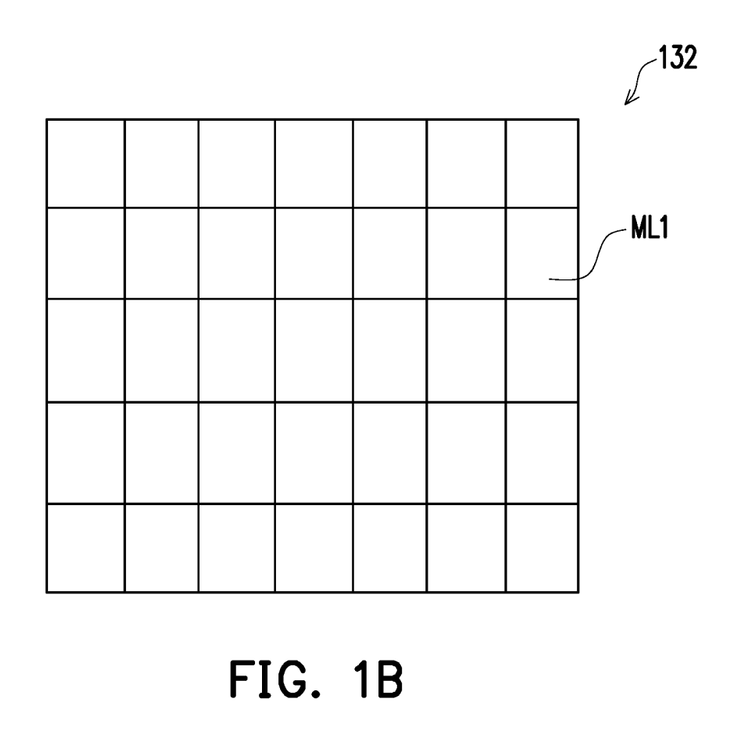
FIG. 1B is a schematic front view of a lens array of the projection apparatus in FIG. 1A.

FIG. 1A is a schematic view of a projection apparatus according to an embodiment of the disclosure. FIG. 1B is a schematic front view of a lens array of the projection apparatus in FIG. 1A. First, referring to FIG. 1A, a projection apparatus 200 of this embodiment includes an illumination system 100, and the illumination system 100 includes an exciting light source module 110, a wavelength conversion device 120 and a light uniforming module 130. The exciting light source module 110 is configured to emit an exciting beam L1. The wavelength conversion device 120 is disposed on a transmission path of the exciting beam L1 and is configured to rotate around a central axis CA. The light uniforming module 130 is disposed on the transmission path of the exciting beam L1 and between the exciting light source module 110 and the wavelength conversion device 120.

In the embodiments of the disclosure, the exciting light source module 110 generally refers to a light source capable of emitting a short-wavelength beam. The peak wavelength of the short-wavelength beam, for example, falls within the wavelength range of a blue light or the wavelength range of an ultraviolet light, wherein the peak wavelength is defined as the wavelength at which the light intensity is the highest. The exciting light source module 110 includes a laser diode (LD), a light emitting diode (LED), or an array or group constituted by one of the above, but the disclosure is not limited thereto. In this embodiment, the exciting light source module 110 is a laser light emitting device including a laser diode chip. For example, the exciting light source module 110 may be, for example, a blue laser diode bank, and the exciting beam L1 may be a blue laser beam, but the disclosure is not limited thereto.

In this embodiment, the light uniforming module 130 includes a lens array 132 and at least one lens (in FIG. 1A, two lenses 134 and 136 are used as an example). As shown in FIG. 1B, the lens array 132 includes a plurality of micro lenses ML1 arranged in an array, and the shape of the orthogonal projection of any one of the plurality of micro lenses ML1 on a reference plane (for example, a plane parallel to the paper plane of FIG. 1B) perpendicular to an optical axis of the lens array 132 (for example, the optical axis being perpendicular to the paper plane of FIG. 1B) is rectangular. The lens 134 and the lens 136 have at least one aspheric surface and at least one non-circularly-symmetric surface. In this embodiment, the lens 134 and the lens 136, for example, have one aspheric surface and one non-circularly-symmetric surface, and the aspheric surface and the non-circularly-symmetric surface may be respectively located on different surfaces, or may be located on the same surface. In other embodiments, the lens 134 and the lens 136 may also have more than one aspheric surface and more than one non-circularly-symmetric surface. In addition, as shown in FIG. 1A, the lens array 132 may have micro lens structures on both surfaces. In other embodiments, the lens array 132 may also have a micro lens structure on only one surface, and the micro lens structure may also be located on any surface of the lens 134 or the lens 136, but the disclosure is not limited thereto.

Figure 2A:
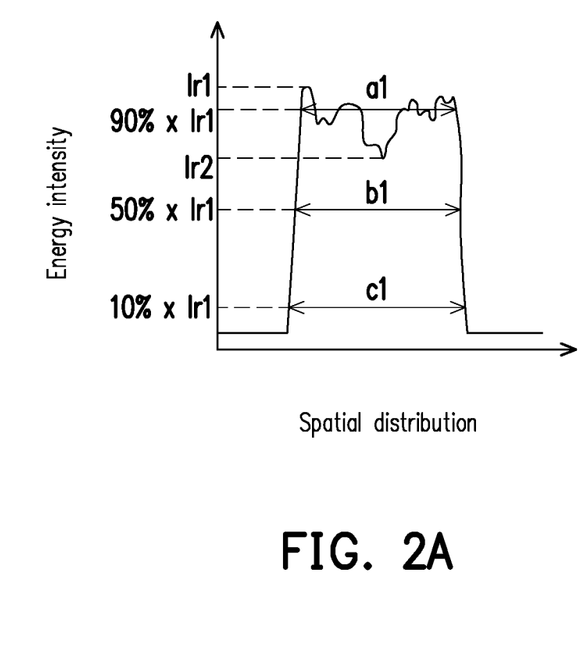
FIG. 2A is an energy intensity distribution diagram of a light spot formed by an exciting beam of FIG. 1A along a radial direction about a central axis.
Figure 2B:
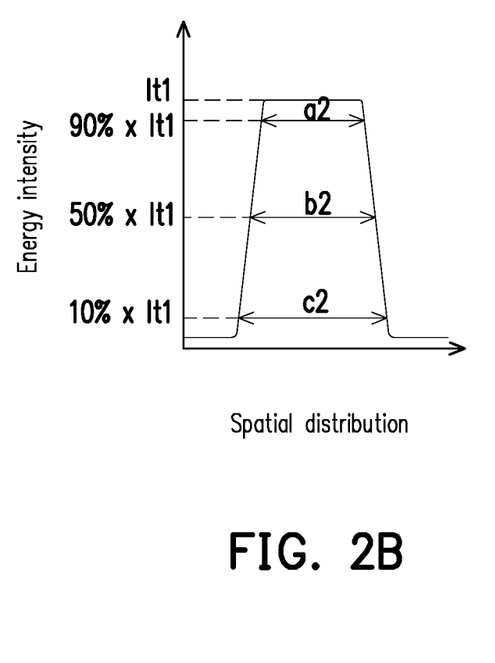
FIG. 2B is an energy intensity distribution diagram of the light spot formed by the exciting beam of FIG. 1A along a tangential direction perpendicular to the radial direction.

FIG. 2A is an energy intensity distribution diagram of a light spot formed by an exciting beam of FIG. 1A along a radial direction about a central axis. FIG. 2B is an energy intensity distribution diagram of the light spot formed by the exciting beam of FIG. 1A along a tangential direction perpendicular to the radial direction. Referring to FIG. 1A, FIG. 2A and FIG. 2B, in this embodiment, after the exciting beam L1 emitted from the exciting light source module 110 passes through the light uniforming module 130, the exciting beam L1 forms a light spot on the wavelength conversion device 120. As shown in FIG. 2A, the energy intensity distribution of the light spot along a radial direction (spatial distribution) about the central axis CA (the radial direction being perpendicular to the central axis CA) is that the energy intensity in the center is lower than those on two sides. As shown in FIG. 2B, the energy intensity distribution of the light spot along a tangential direction (spatial distribution) perpendicular to the radial direction is close to a top-hat distribution. As shown in FIG. 2A and FIG. 2B, the energy intensity distribution of the light spot along the tangential direction perpendicular to the radial direction is different form the energy intensity distribution of the light spot along the radial direction.

Specifically, as shown in FIG. 2A, the energy intensity of the light spot on two side regions along the radial direction may have a maximum energy intensity Ir1, and the energy intensity of the light spot in a middle region along the radial direction may have a minimum energy intensity Ir2. For example, the minimum energy intensity Ir2 of the middle region is, for example, smaller than the maximum energy intensity Ir1 of the two side regions and is greater than or equal to 90% of the maximum energy intensity Ir1. Alternatively, the minimum energy intensity Ir2 of the middle region may also be less than 90% of the maximum energy intensity Ir1 of the two side regions, the disclosure is not limited thereto.

In addition, at least one of the energy intensity distribution diagram of the light spot along the tangential direction perpendicular to the radial direction and the energy intensity distribution diagram of the light spot along the radial direction satisfies: $b<1.5a$, $c<2a$, and $b<c$, wherein a is a width of where the energy intensity equals to 90% of the maximum energy intensity, b is a width of where the energy intensity equals 50% of the maximum energy intensity, and c is a width of where the energy intensity equals 10% of the maximum energy intensity, wherein the above widths are, for example, the width of the light spot on the spatial distribution at a specific energy intensity. For example, as shown in FIG. 2A, if the width of where 90% of the maximum energy intensity Ir1 is a1, the width of where 50% of the maximum energy intensity Ir1 is b1, and the width of where 10% of the maximum energy intensity Ir1 is c1, then the energy intensity distribution diagram of the spot along the radial direction satisfies: $b1<1.5a1$, $c1<2a1$ and $b1<c1$. As shown in FIG. 2B, if the width of where 90% of the maximum energy intensity It1 is a2, the width of where 50% of the maximum energy intensity It1 is b2, and the width of where 10% of the maximum energy intensity It1 is c2, then the energy intensity distribution diagram of the spot along the tangential direction satisfies: $b2<1.5a2$, $c2<2a2$ and $b2<c2$.

In this embodiment, the light spot formed by the exciting beam L1 emitted from the exciting light source module 110 is approximately elliptical, and its energy intensity distribution is close to the Gaussian distribution. After the exciting beam L1 passes through the lens array 132, the light spot formed by the exciting beam L1 may be converted into an approximately rectangular shape, and the energy intensity distribution of the beam is converted into a more uniform energy intensity distribution. At this moment, the energy intensity distribution of the light spot along the radial direction and the energy intensity distribution of the light spot along the tangential direction are closer to the top-hat distribution. Next, after passing through the lens 134 and the lens 136 having an aspheric surface and a non-circularly-symmetric surface, the energy intensity distribution of the light spot formed by the exciting beam L1 may be converted to be lower in the center and higher on the two sides along the radial direction, but be close to the top-hat distribution along the tangential direction. Herein, the exciting beam L1 passing through the aspheric surface is adapted to form the light spot having the energy intensity distribution to be lower in the center and higher on the two sides in both the radial direction and the tangential direction, and the exciting beam L1 passing through the non-circularly-symmetric surface is adapted to form the light spot having the energy intensity distribution along the tangential direction again to be close to the top-hat distribution. As such, as shown in FIG. 2A and FIG. 2B, the energy intensity distribution of the light spot along the tangential direction is different from the energy intensity distribution of the light spot along the radial direction.

Based on the above, in the embodiments of the disclosure, with the light uniforming module 130, the shape of the light spot formed by the exciting beam L1 may be converted into an approximately rectangular shape, and the energy intensity distribution may be converted into a more uniform energy intensity distribution. As such, the energy intensity of the exciting beam L1 on the wavelength conversion device 120 is not excessively concentrated, which may prevent the conversion efficiency of the wavelength conversion device 120 from reducing and prevents the wavelength conversion device 120 from burning out. In addition, the wavelength conversion device 120 is a rotating element. Through the design of the light uniforming module 130, the energy intensity distribution of the light spot which is lower in the center and higher on the two sides along the radial direction may reduce the thermal energy accumulation from the center spreading toward the two sides, such that the light spot is in a similar temperature in the center and on the two sides, which benefits in maintaining the conversion efficiency.

It should be noted that, since the energy on the wavelength conversion device 120 along the tangential direction is averaged by the rotation during the wavelength conversion device rotating, in this embodiment, the energy intensity distribution of the light spot along the tangential direction is maintained as the top-hat distribution. However, in other embodiments, the lens 134 and the lens 136 of the light uniforming module 130 may also not have a non-circularly-symmetric surface, such that the energy intensity distribution of the light spot along the radial direction and the energy intensity distribution of the light spot along the tangential direction are both lower in the center and higher on the two sides, but the disclosure is not limited thereto.

Figure 3:
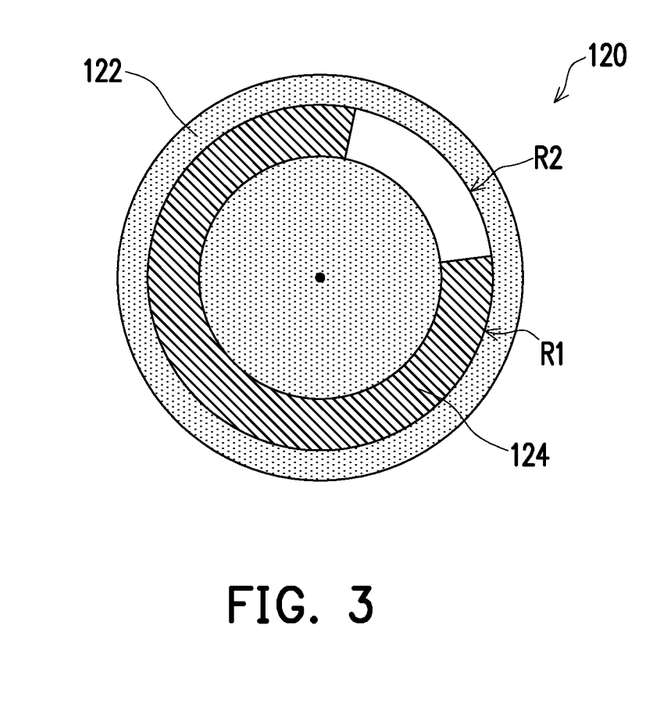
FIG. 3 is a schematic front view of a wavelength conversion device in FIG. 1A.

FIG. 3 is a schematic front view of a wavelength conversion device in FIG. 1A. In the embodiments of the disclosure, the wavelength conversion device 120 is an optical element capable of converting a short-wavelength beam traveling to the wavelength conversion device 120 into a long-wavelength beam relative to the short-wavelength beam. In this embodiment, the wavelength conversion device 120 is a phosphor wheel, but is not limited thereto.

Referring to FIG. 1A and FIG. 3, the wavelength conversion device 120 is a rotatable disk-shaped element. The wavelength conversion device 120 includes a wavelength conversion region R1 and a light transmission region R2, and includes a substrate 122 and the central axis CA. The wavelength conversion region R1 and the light transmission region R2 are disposed on the substrate 122, and a wavelength conversion material 124 is located in the wavelength conversion region R1. The wavelength conversion material 124 is, for example, a yellow phosphor. In this embodiment, the substrate 122 of the wavelength conversion device 120 is, for example, a reflective substrate, and the light transmission region R2 is, for example, a hollow region on the substrate for the exciting beam L1 to pass through. The wavelength conversion region R1 and the light transmission region R2 are capable of rotating around the central axis CA along with the wavelength conversion device 120, so as to cut into the transmission path of the exciting beam L1 in turns. Herein, after the exciting beam L1 emitted from the exciting light source module 110 passes through the light uniforming module 130, the exciting beam L1 may form the aforementioned light spot when, for example, being incident on the surface of the wavelength conversion region R1 and the light transmission region R2 of the wavelength conversion device 120. When the light transmission region R2 cuts into the transmission path of the exciting beam L1, the exciting beam L1 passes through the wavelength conversion device 120. When the wavelength conversion region R1 cuts into the transmission path of the exciting beam L1, the exciting beam L1 is converted into a conversion beam L2 by the wavelength conversion region R1, and the conversion beam L2 may be reflected by the wavelength conversion device 120. The conversion beam L2 is, for example, a yellow beam. In other embodiments, the wavelength conversion device 120 may also include a plurality of wavelength conversion regions which respectively convert the exciting beam L1 into lights in different colors.

In other embodiments, the wavelength conversion device may include a wavelength conversion region and a non-wavelength conversion region, the substrate may be, for example, a reflective substrate, and the non-wavelength conversion region may be, for example, a region directly reflecting the exciting beam. The disclosure is not limited thereto.

Referring to FIG. 1A again, the illumination system 100 further includes a light combining unit 140 and a light transmission module 150. The light combining unit 140 is located between the exciting light source module 110 and the wavelength conversion device 120, and is located on the transmission paths of the conversion beam L2 and the exciting beam L1 having passed through the wavelength conversion device 120. The light transmission module 150 is located on the transmission path of the exciting beam L1 having passed through the wavelength conversion device 120. Specifically, the light combining unit 140 may be a dichroic mirror (DM) or a dichroic prism, and may provide different optical effects on beams in different colors. For example, in this embodiment, the light combining unit 140, for example, allows the blue exciting beam to pass through, and reflects the beams in other colors (such as red, green and yellow, etc.). The light transmission module 150 may include a plurality of lenses 152 and reflective mirrors 154 disposed between the plurality of lenses 152, which are capable of transmitting the exciting beam L1 having passed through the wavelength conversion device 120 back to the light combining unit 140.

In this embodiment, the light combining unit 140 may be designed for the exciting beam L1 to pass through and reflecting the conversion beam L2. As such, the light combining unit 140 may transmit the exciting beam L1 from the exciting light source module 110 to the wavelength conversion device 120, and after the light transmission module 150 transmits the exciting beam L1 having passed through the wavelength conversion device 120 back to the light combining unit 140, the combining unit 140 may combine the conversion beam L2 from the wavelength conversion device 120 with the exciting beam L1 having passed through the wavelength conversion device 120.

In this embodiment, the illumination system 100 further includes a light filter assembly 160 and a light uniforming element 170 disposed on the transmission paths of the exciting beam L1 and the conversion beam L2 from the light combining unit 140. The light filter assembly 160 is capable of filtering out beams having a wavelength falling out of a specific wavelength range and allowing beams having a wavelength falling within this specific wavelength range to pass through, so as to improve the color purity of the colored light. In this embodiment, the light filter assembly 160 is, for example, a filter wheel or any other optical element having an effect of color filtering, and the light uniforming element 170 is, for example, a light integration rod. However, the disclosure is not limited thereto. In addition, the illumination system 100 may also include one or more lenses, such as a lens C1 located between the exciting light source module 110 and the light uniforming module 130, or a lens C2 located between the light combining element 140 and the light filter assembly 160, so as to adjust a beam path inside the illumination system 100.

It should be noted herein that, when the light uniforming element 170 is a light integration rod with a rectangular light input end, the light uniforming module 130 first converts the shape of the light spot formed by the beam passing through the light uniforming module 130 to a rectangular shape similar to the rectangle of the light input end of the light uniforming element 170, which benefits in improving the light collection efficiency of the light uniforming element 170 in subsequent processing and helps increasing the light efficiency of the illumination system 100 and the projection apparatus 200.

As shown in FIG. 1A, the projection apparatus 200 of this embodiment further includes a light valve 210 and a projection lens 220. The light valve 210 is disposed on the transmission paths of the conversion beam L2 and the exciting beam L1 from the illumination system 100, so as to modulate the conversion beam L2 and the exciting beam L1 into an image beam L3. The projection lens 220 is disposed on a transmission path of the image beam L3 and is capable of projecting the image beam L3 onto a screen (not illustrated) to form an image. Since that after these exciting beam L1 and conversion beam L2 in different colors converge on the light valve 210, the light valve 210 sequentially converts these exciting beam L1 and conversion beam L2 in different colors to image beam L3 in different colors and transmits the image beam L3 in different colors to the projection lens 220, the image of the image beam L3 projected out of the projection apparatus 200 and converted by the light valve 210 is a colored image.

In this embodiment, the light valve 210 is, for example, a digital micro-mirror device (DMD) or a liquid-crystal-on-silicon panel (LCOS panel). However, in other embodiments, the light valve 210 may also be a transmissive liquid crystal panel or any other spatial light modulator. In this embodiment, the projection lens 220 is, for example, a combination including one or more optical lenses having refractive power, and the optical lenses include a non-flat lens, such as a biconcave lens, a biconvex lens, a concave-convex lens, a convex-concave lens, a plano-convex lens, a plano-concave lens, and a variety of combinations thereof. The disclosure does not limit the type and kind of the projection lens 220.

It should be noted that the reference numerals and part of the contents of the previous embodiment are used in the following embodiments, in which identical reference numerals indicate identical or similar components, and descriptions of the same technical contents are omitted.

Figure 4A:
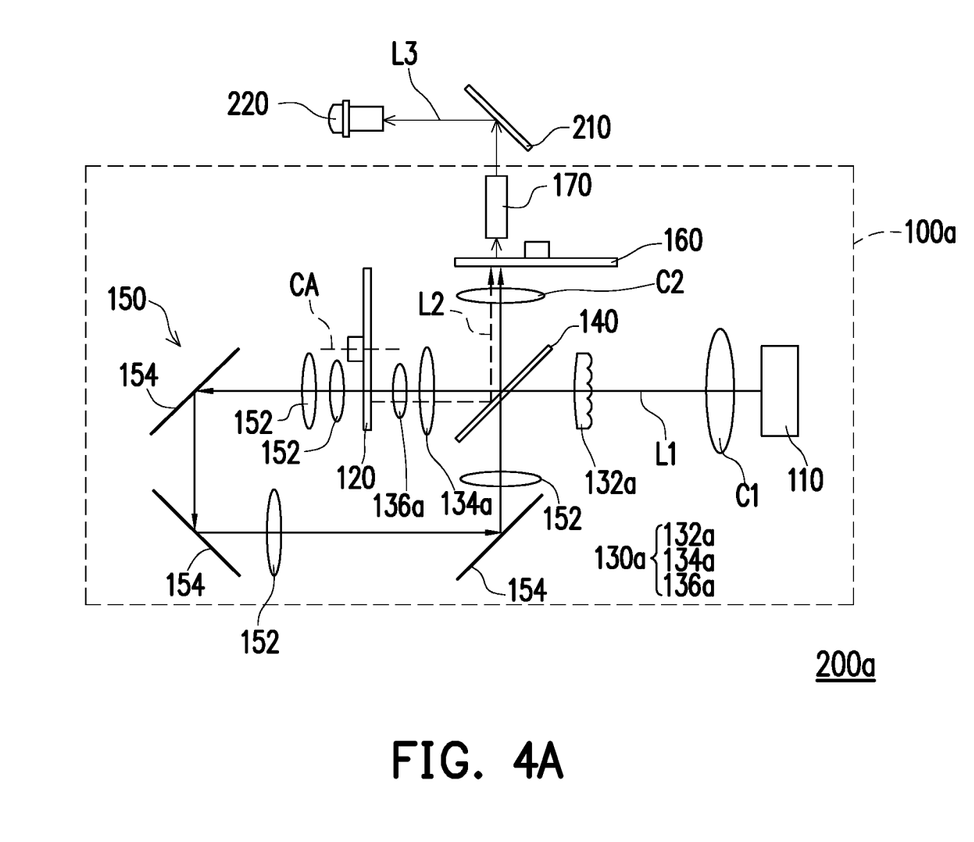
FIG. 4A is a schematic view of a projection apparatus according to another embodiment of the disclosure.
Figure 4B:
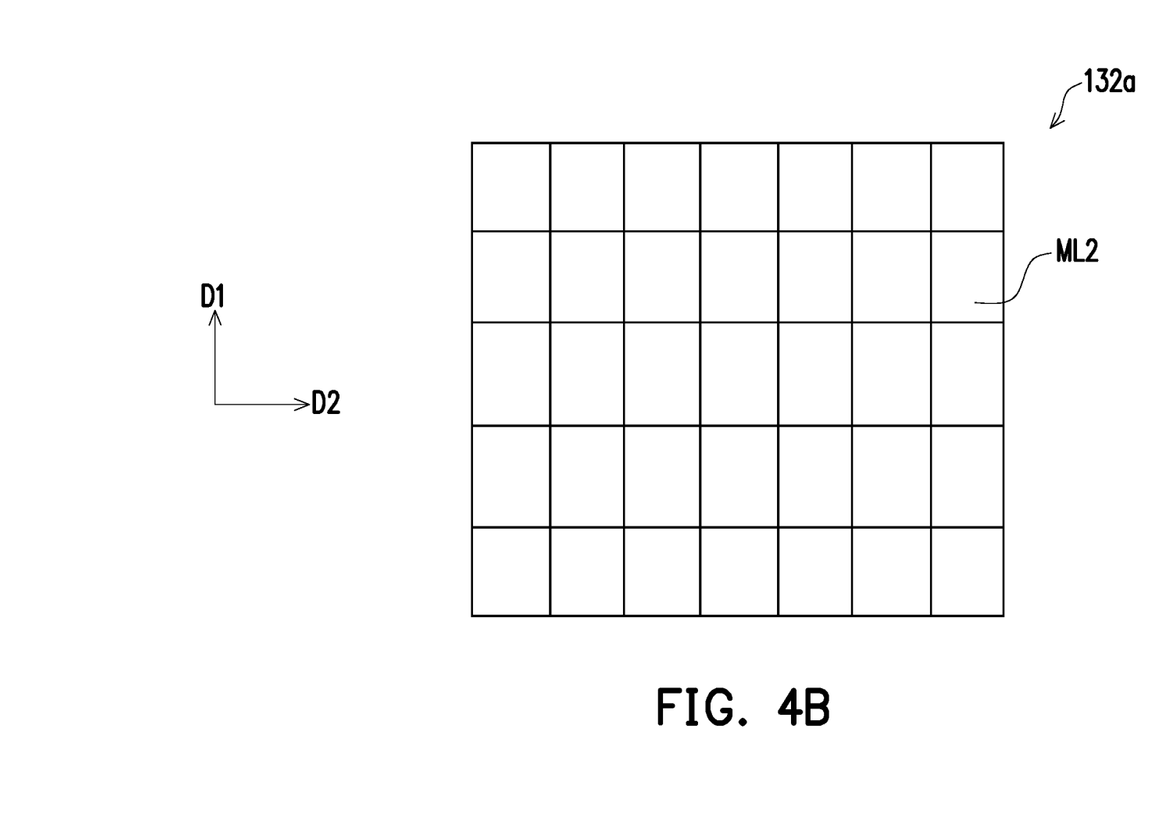
FIG. 4B is a schematic front view of a lens array of the projection apparatus in FIG. 4A.

FIG. 4A is a schematic view of a projection apparatus according to another embodiment of the disclosure. FIG. 4B is a schematic front view of a lens array of the projection apparatus in FIG. 4A. Referring to FIG. 4A and FIG. 4B, a projection apparatus 200a of this embodiment is generally similar to the projection apparatus 200 in FIG. 1A, wherein the main structural difference of the projection apparatus 200a is that: a light uniforming module 130a of an illumination system 100a includes a lens array 132a and at least one lens (In FIG. 4A, two lens 134a and 136a are used as an example.). the lens array 132a includes a plurality of micro lenses ML2 arranged in an array, and the shape of the orthogonal projection of any one of the plurality of micro lenses ML2 on a reference plane (for example, a plane parallel to the paper plane of FIG. 4B) perpendicular to an optical axis of the lens array 132a (for example, the optical axis being perpendicular to the paper plane of FIG. 4B) is rectangular. Each of the plurality of micro lenses ML2 of the lens array 132a has a first curvature along a first direction D1 (for example, the top-bottom direction in FIG. 4B) and has a second curvature along a second direction D2 (for example, the left-right direction in FIG. 4B), and the first curvature is different from the second curvature, wherein the first direction D1 and the second direction D2 are perpendicular to the optical axis of the lens array 132a, for example, the optical axis is perpendicular to the paper plane of FIG. 4B. In addition, the lens 134a and the lens 136a, for example, have one aspheric surface. In other embodiments, the lens 134a and the lens 136a may also have more than one aspheric surfaces. In addition, as shown in FIG. 4A, the lens array 132a may have a micro lens structure on one of the surfaces. In other embodiments, the lens array 132a may also have micro lens structures on both surfaces, the micro lens structure may also be located on any surface of the lens 134 or the lens 136, the disclosure is not limited thereto.

In other embodiments, since the micro lens ML2 of the lens array 132a has different curvatures respectively along the first direction D1 and along the second direction D2, the light spot formed by the exciting beam L1 thereby generates different energy intensity distributions along the radial direction and along the tangential direction. Therefore, after the exciting beam L1 passes through the lens array 132a and the lenses 134a and 136a having an aspheric surface, not only the shape of the light spot formed by the exciting beam L1 on the wavelength conversion device 120 is converted into an approximately rectangular shape and the energy intensity distribution is converted into a more uniform energy intensity distribution, but the energy intensity distribution of the light spot is also converted to be lower in the center and higher on the two sides along the radial direction, but be close to the top-hat distribution along the tangential direction.

Figure 5:
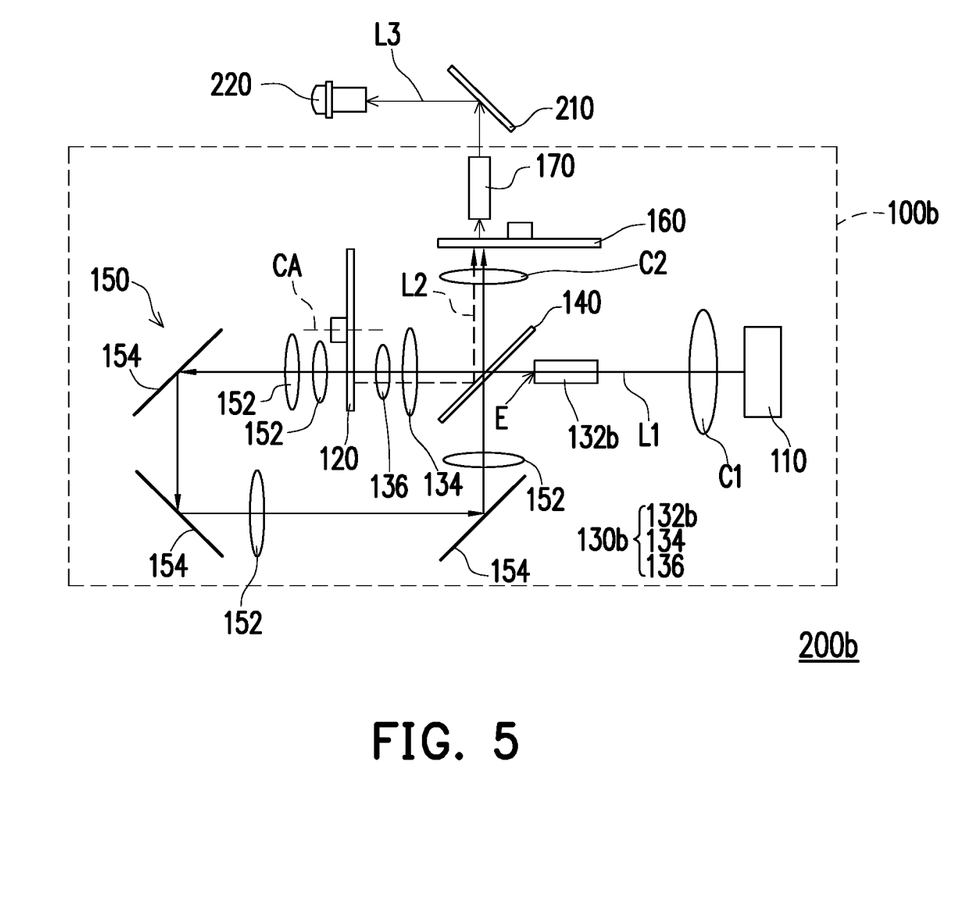
FIG. 5 is a schematic view of a projection apparatus according to another embodiment of the disclosure.

FIG. 5 is a schematic view of a projection apparatus according to another embodiment of the disclosure. Referring to FIG. 5, a projection apparatus 200b of this embodiment is generally similar to the projection apparatus 200 in FIG. 1A, wherein the main structural difference of the projection apparatus 200b is that: a light uniforming module 130b of an illumination system 100b includes a light integration rod 132b and at least one lens (In FIG. 5A, two lenses 134 and 136 are used as an example.). The light integration rod 132b has a rectangular light output end E. Descriptions regarding the lens 134 and the lens 136 can be found in the above embodiments of the projection apparatus 200 and thus are not be repeated herein.

In this embodiment, after the exciting beam L1 from the exciting light source module 110 passes through the light integration rod 132b of the light uniforming module 130b, the shape of the light spot formed by the exciting beam L1 is converted into an approximately rectangular shape and the energy intensity distribution is converted into a more uniform energy intensity distribution. At this moment, the energy intensity distribution of the light spot along the radial direction and the energy intensity distribution of the light spot along the tangential direction are closer to the top-hat light distribution. Next, after passing through the lens 134 and the lens 136 having an aspheric surface and a non-circularly-symmetric surface, the energy intensity distribution of the light spot formed by the exciting beam L1 on the wavelength conversion device 120 may be converted to be lower in the center and higher on the two sides along the radial direction, but be close to the top-hat distribution along the tangential direction. In addition, in other embodiments, the lens 134 and the lens 136 of the light uniforming module 130 may also not have a non-circularly-symmetric surface, such that the energy intensity distribution of the light spot along the radial direction and the energy intensity distribution of the light spot along the tangential direction are both lower in the center and higher on the two sides, but the disclosure is not limited thereto.

Figure 6:
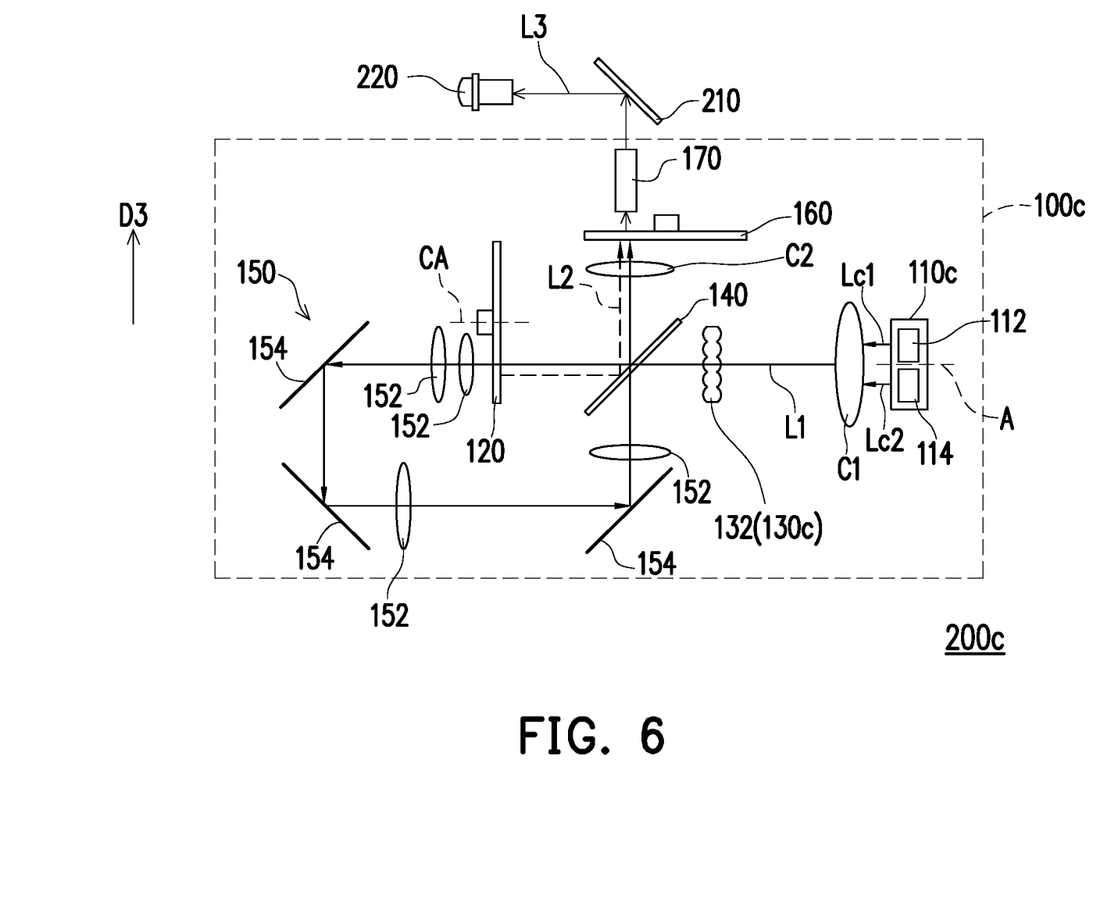
FIG. 6 is a schematic view of a projection apparatus according to another embodiment of the disclosure.

FIG. 6 is a schematic view of a projection apparatus according to another embodiment of the disclosure. Referring to FIG. 6, a projection apparatus 200c of this embodiment is generally similar to the projection apparatus 200 in FIG. 1A, wherein the main structural difference of the projection apparatus 200c is that: an exciting light source module 110c of an illumination system 100c includes a first exciting light source 112 and a second exciting light source 114. A light uniforming module 130c of the illumination system 100c includes a lens array 132. The first exciting light source 112 is configured to emit a first exciting beam Lc1, and the first exciting beam Lc1, for example, is a blue exciting beam. The second exciting light source 114 is configured to emit a second exciting beam Lc2, and the second exciting beam Lc2, for example, is a blue exciting beam, wherein the first exciting light source 112 and the second exciting light source 114 are disposed on two opposite sides of an optical axis A of the exciting light source module 110c, and the exciting beam L1 includes the first exciting beam Lc1 and the second exciting beam Lc2. The two opposite sides of the optical axis A are, for example, the upper and the lower sides of the optical axis A in FIG. 6. Descriptions regarding the lens array 132 can be found in the above embodiments of the projection apparatus 200 and thus are not be repeated herein.

In this embodiment, the first exciting light source 112 and the second exciting light source 114 may be disposed corresponding to the radial direction of where the exciting beam L1 travels to the wavelength conversion device 120. For example, if the radial direction of where the exciting beam L1 travels to the wavelength conversion device 120 is a third direction D3 in FIG. 6, the first exciting light source 112 and the second exciting light source 114 may be disposed on two opposite sides of the optical axis A of the exciting light source module 110c along the third direction D3 correspondingly, such that the first exciting light source 112 is spaced apart from the second exciting light source 114. As such, the first exciting beam Lc1 and the second exciting beam Lc2 form two sub-light spots partially overlapping with each other (not illustrated), and the energy intensity distribution of the light spot formed by the two sub-light spots on the beam conversion device 120 along the radial direction may be lower in the center and higher on the two sides. Moreover, after the exciting beam L1 passes through the lens array 132, the shape of the light spot formed by the exciting beam L1 is converted into an approximately rectangular shape and the energy intensity distribution is converted into a more uniform energy intensity distribution. At this moment, the energy intensity distribution of the light spot is lower in the center and higher on the two sides along the radial direction, but the energy intensity distribution of the light spot is close to the top-hat distribution along the tangential direction.

In sum of the above, in the illumination system and the projection apparatus according to the embodiments of the disclosure, after the exciting beam emitted from the exciting light source module passes through the light uniforming module, the exciting beam forms a light spot on the wavelength conversion device, and the energy intensity distribution of the light spot along the radial direction about the central axis is that the energy intensity is lower in the center and higher on the two sides. As such, the energy intensity of the exciting beam on the wavelength conversion device is not excessively concentrated, which may prevent the conversion efficiency of the wavelength conversion device from reducing and prevents the wavelength conversion device from burning out. In addition, the energy intensity distribution which is lower in the center and higher on the two sides may reduce the thermal energy accumulation from the center spreading toward the two sides, such that the light spot is in a similar temperature in the center and on the two sides, which benefits in maintaining the conversion efficiency. Therefore, the illumination system according to the embodiments of the disclosure has a better illumination uniformity, a better light efficiency and a longer life. Accordingly, the projection apparatus according to the embodiments of the disclosure, which includes the aforementioned illumination system, has a better image quality, a better light efficiency and a longer life.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An illumination system comprising:
   an exciting light source module configured to emit an exciting beam,
   a wavelength conversion device disposed on a transmission path of the exciting beam and capable of rotating around a central axis,
   a light uniforming module disposed on the transmission path of the exciting beam and between the exciting light source and the wavelength conversion device, the light uniforming module comprising a lens array and at least one lens, the at least one lens comprising an aspheric surface and a non-circularly-symmetric surface, and
   a light combining unit located between the exciting light source module and the wavelength conversion device, the lens array comprising a plurality of micro lenses arranged in an array, wherein the at least one lens comprising the aspheric surface and the non-circularly-symmetric surface is disposed between the light combining unit and the wavelength conversion device,
   wherein the exciting beam forms a light spot on the wavelength conversion device after the exciting beam emitted from the exciting light source module sequentially passes through the lens array, the light combining unit the aspheric surface of the at least one lens, and the non-circularly symmetric surface of the at least one lens, and an energy intensity distribution of the light spot formed on the wavelength conversion device along a radial direction about the central axis is lower in a center and higher on two sides, and an energy intensity distribution of the light spot formed on the wavelength conversion device along a tangential direction is a top-hat distribution.

2. The illumination system according to claim 1, wherein at least one of an energy intensity distribution diagram of the light spot along a tangential direction perpendicular to the radial direction and an energy intensity distribution of the light spot along the radial direction satisfies: $b<1.5a$, $c<2a$ and $b<c$, wherein a is a width of where an energy intensity equals to 90% of a maximum energy intensity, b is a width of where the energy intensity equals 50% of the maximum energy intensity, and c is a width of where the energy intensity equals 10% of the maximum energy intensity.

3. The illumination system according to claim 1, wherein an orthogonal projection of any one of the plurality of micro lenses on a reference plane perpendicular to an optical axis of the lens array is rectangular.

4. The illumination system according to claim 3, wherein each of the plurality of micro lenses of the lens array has a first curvature along a first direction and has a second curvature along a second direction, the first curvature is different from the second curvature, and the first direction and the second direction are perpendicular to the optical axis of the lens array.

5. The illumination system according to claim 1, wherein the light uniforming module comprises:
   a light integration rod comprising a rectangular light output end.

6. The illumination system according to claim 5, wherein the at least one lens has at least one non-circularly-symmetric surface.

7. The illumination system according to claim 1, wherein the wavelength conversion device comprises a wavelength conversion region and a light transmission region, the wavelength conversion region and the light transmission region are capable of rotating around the central axis along with the wavelength conversion device for cutting into the transmission path of the exciting beam in turns, the exciting beam passes through the wavelength conversion device when the light transmission region cuts into the transmission path of the exciting beam, and the exciting beam is converted into a conversion beam by the wavelength conversion region when the wavelength conversion region cuts into the transmission path of the exciting beam.

8. The illumination system according to claim 7, wherein the light combining unit is located on transmission paths of the conversion beam and the exciting beam having passed through the wavelength conversion device, the light combining unit transmits the exciting beam to the wavelength conversion device, and the light combining unit allows the exciting beam to pass through and reflects the conversion beam.

9. The illumination system according to claim 8 further comprising a light transmission module capable of transmitting the exciting beam having passed through the wavelength conversion device back to the light combining unit.

10. The illumination system according to claim 1, wherein the exciting light source module comprises:
 a first exciting light source capable of emitting a first exciting beam; and
 a second exciting light source capable of emitting a second exciting beam, wherein the first exciting light source and the second exciting light source are disposed on two opposite sides of an optical axis of the exciting light source module, and the exciting beam includes the first exciting beam and the second exciting beam.

11. The illumination system according to claim 10, wherein the first exciting light source and the second exciting light source are disposed on the two opposite sides of the optical axis of the exciting light source module along a direction identical to the radial direction.

12. A projection apparatus comprising:
 an illumination system comprising:
  an exciting light source module configured to emit an exciting beam,
  a wavelength conversion device disposed on a transmission path of the exciting beam and capable of rotating around a central axis, wherein the wavelength conversion device comprises a wavelength conversion region and a light transmission region capable of cutting into the transmission path of the exciting beam in turns, the exciting beam passes through the wavelength conversion device when the light transmission region cuts into the transmission path of the exciting beam, and the exciting beam is converted into a conversion beam by the wavelength conversion region when the wavelength conversion region cuts into the transmission path of the exciting beam,
  a light uniforming module disposed on the transmission path of the exciting beam and between the exciting light source module and the wavelength conversion device, the light uniforming module comprising a lens array and at least one lens, the at least one lens comprising an aspheric surface and a non-circularly-symmetric surface, wherein the exciting beam forms a light spot on the wavelength conversion device after the exciting beam emitted from the exciting light source module passes through the light uniforming module, and an energy intensity distribution of the light spot along a radial direction about the central axis is lower in a center and higher on two sides, and
  a light combining unit located on transmission paths of the conversion beam and the exciting beam having passed through the wavelength conversion device, the light combining unit located between the exciting light source module and the wavelength conversion device, the lens array comprising a plurality of micro lenses arranged in an array, wherein the light combining unit allows the exciting beam to pass through and reflects the conversion beam, the at least one lens is disposed between the light combining unit and the wavelength conversion device, and the exciting beam emitted from the exciting light source module sequentially passes through the lens array, the light combining unit, the aspheric surface of the at least one lens, and the non-circularly symmetric surface of the at least one lens, and an energy intensity distribution of the light spot formed on the wavelength conversion device along a radial direction about the central axis is lower in a center and higher on two sides, and an energy intensity distribution of the light spot formed on the wavelength conversion device along a tangential direction is a top-hat distribution;
 a light valve disposed on transmission paths of the conversion beam and the exciting beam from the combining unit for modulating the conversion beam and the exciting beam into an image beam; and
 a projection lens disposed on a transmission path of the image beam.

13. The projection apparatus according to claim 12, wherein at least one of an energy intensity distribution diagram of the light spot along a tangential direction perpendicular to the radial direction and an energy intensity distribution of the light spot along the radial direction satisfies: $b<1.5a$, $c<2a$ and $b<c$, wherein a is a width of where an energy intensity equals to 90% of a maximum energy intensity, b is a width of where the energy intensity equals 50% of the maximum energy intensity, and c is a width of where the energy intensity equals 10% of the maximum energy intensity.

14. The projection apparatus according to claim 12, wherein
 an orthogonal projection of any one of the plurality of micro lenses on a reference plane perpendicular to an optical axis of the lens array is rectangular.

15. The projection apparatus according to claim 14, wherein each of the plurality of micro lenses of the lens array has a first curvature along a first direction and has a second curvature along a second direction, the first curvature is different from the second curvature, and the first direction and the second direction are perpendicular to the optical axis of the lens array.

16. The projection apparatus according to claim 12, wherein the exciting light source module comprises:
 a first exciting light source capable of emitting a first exciting beam; and
 a second exciting light source capable of emitting a second exciting beam, wherein the first exciting light source and the second exciting light source are disposed on two opposite sides of an optical axis of the exciting light source module, and the exciting beam includes the first exciting beam and the second exciting beam.

* * * * *